March 20, 1951 K. R. BENDER 2,545,643
RECORD CHANGER PHONOGRAPH
Filed Nov. 29, 1944 7 Sheets-Sheet 1

INVENTOR.
Kenneth R. Bender
BY
James & Franklin
Attorneys.

March 20, 1951 K. R. BENDER 2,545,643

RECORD CHANGER PHONOGRAPH

Filed Nov. 29, 1944 7 Sheets-Sheet 2

INVENTOR.
Kenneth R. Bender
BY James & Franklin
Attorneys.

March 20, 1951 K. R. BENDER 2,545,643

RECORD CHANGER PHONOGRAPH

Filed Nov. 29, 1944 7 Sheets-Sheet 3

INVENTOR.
Kenneth R. Bender
BY
James & Franklin
Attorneys,

March 20, 1951 K. R. BENDER 2,545,643

RECORD CHANGER PHONOGRAPH

Filed Nov. 29, 1944 7 Sheets-Sheet 4

INVENTOR.
Kenneth R. Bender
BY
James & Franklin
Attorneys.

March 20, 1951 K. R. BENDER 2,545,643

RECORD CHANGER PHONOGRAPH

Filed Nov. 29, 1944 7 Sheets-Sheet 5

INVENTOR.
Kenneth R. Bender
BY James & Franklin
Attorneys.

March 20, 1951 K. R. BENDER 2,545,643

RECORD CHANGER PHONOGRAPH

Filed Nov. 29, 1944 7 Sheets-Sheet 6

INVENTOR.
Kenneth R. Bender
BY
James & Franklin
Attorneys.

March 20, 1951 K. R. BENDER 2,545,643

RECORD CHANGER PHONOGRAPH

Filed Nov. 29, 1944 7 Sheets-Sheet 7

INVENTOR.
Kenneth R. Bender
BY
James & Franklin
Attorneys.

Patented Mar. 20, 1951 2,545,643

UNITED STATES PATENT OFFICE 2,545,643

RECORD CHANGER PHONOGRAPH

Kenneth R. Bender, Elizabeth, N. J., assignor to General Instrument Corporation, Elizabeth, N. J., a corporation of New Jersey Application November 29, 1944, Serial No. 565,588

19 Claims. (Cl. 274—10)

This invention relates to a record changer phonograph and more particularly to a record changer phonograph of the type in which a plurality of records are stacked above the turntable and are individually fed therefrom to the turntable by releasing the bottom record of the stack.

In record changer phonographs of this character, mechanism is provided automatically actuatable when the playing of one record is completed for carrying out the following sequence of operations: Lifting the reproducer or tone arm from the played record, shifting the tone arm to clear the record area, feeding a new record from the record stack on to the played record (or onto the turntable when no record has as yet been played), returning the tone arm to a starting position over the new record, and lowering the tone arm on to or adjacent the starting groove of the new record. Records commonly used in practice are of different sizes or diameters and those most commonly employed are 10" and 12" diameter records. Mechanism for automatically effecting a record change is customarily designed and constructed so that the phonograph may be used for both 10" or 12" records.

This operation and these requirements impose certain limitations in the design of such a record changer phonograph, with the result that the apparatus employed is comparatively complicated and composed of numerous parts complexly interrelated.

It is a prime object of my present invention to provide a new record changer phonograph of this character embodying in addition to new and improved operating features and characteristics an overall simplified construction so that a generally low cost machine is obtained which may be efficiently operated, easily repaired and readily maintained.

The principal improvements in a record changer of this type supplied by my present invention are the following:

1. The machine embodies mechanism for determining the position of and for positioning the tone arm in the following three positions: a starting position for a large record when large records are being supported in and supplied from the magazine of the machine, a starting position for a small record when small records are being supported in and supplied from the magazine, and an initial or stopping position when there is no record in, as when the supply of records has been depleted from the magazine.

2. The machine embodies mechanism for stopping the operation of the machine motor after the last record of the magazine stack has been fed to the turntable and played.

3. The provision of a machine embodying such mechanism in which the machine may be set into operation by merely manually moving the tone arm to record starting position.

4. The provision of such a machine embodying this mechanism in which the machine may be set into operation either by manually moving the tone arm to record starting position provided that there is a record on the turntable or by simply depressing the tone arm in its initial or stop position, provided, however that there is a record in the magazine to be played.

5. The provision of a record changer phonograph of this type which may thus be readily adjusted by the user for the operation of different size records such as 10" and 12" records, in which the machine may thus be set into operation by the most simple and natural movements of the tone arm, in which the machine will automatically stop when all of the records in the magazine have been fed and played, and in which all of these operations are "fool-proof" and carried out by a machine of exceedingly simple design.

To the accomplishment of the foregoing and such other objects as may hereinafter appear, my invention resides in the phonograph combinations and subcombinations and the novel elements thereof as sought to be defined in the appended claims and as described in the following specification taken together with the accompanying drawings.

*General organization of the machine*

Figures 1, 2:
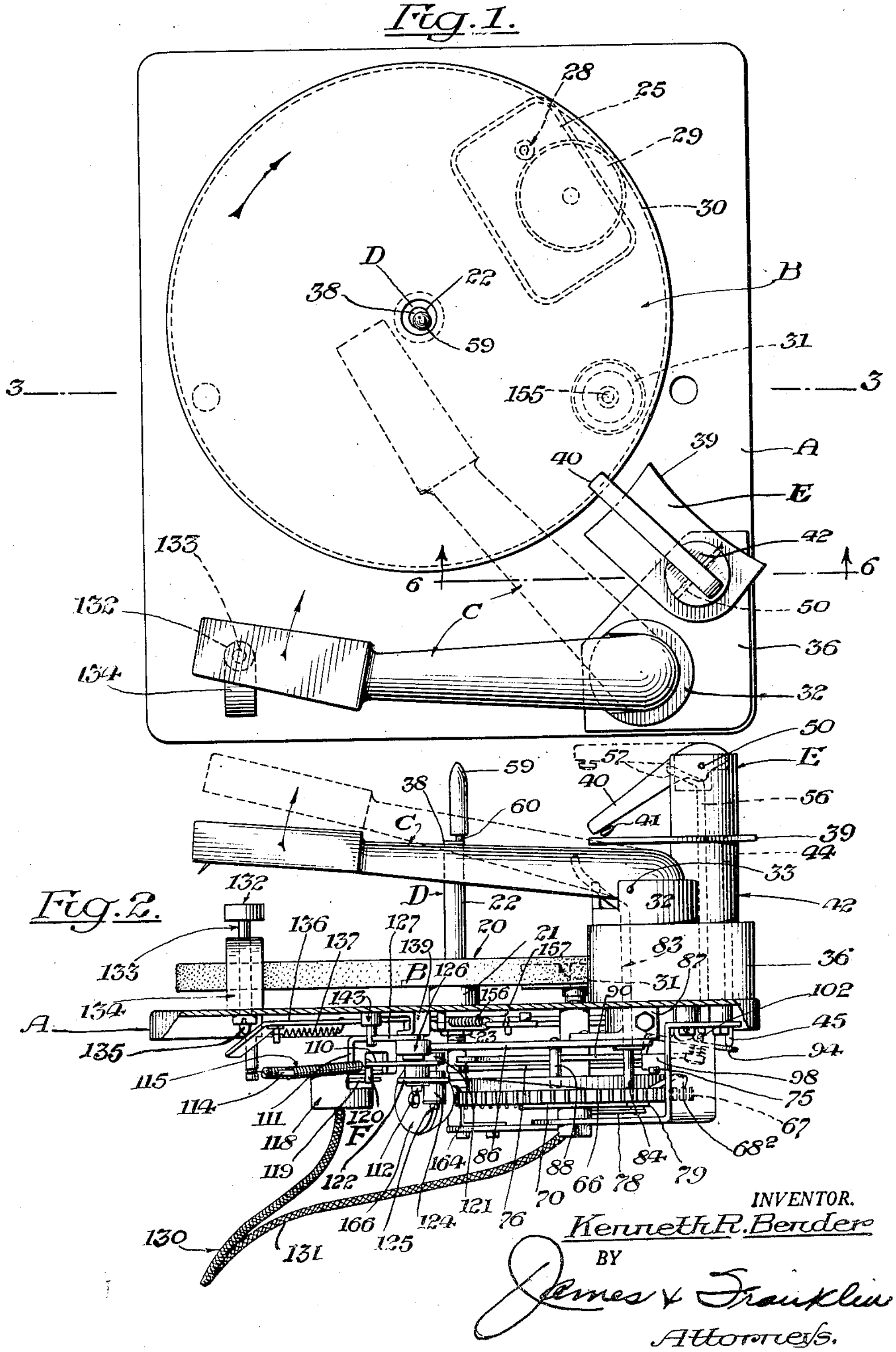
Fig. 1 is a top plan view of the phonograph of the present invention.
Fig. 2 is a front elevational view thereof with part of the housing plate broken away to reveal the operating parts thereof.

Referring now more in detail to the drawings, and having reference first to Figs. 1 and 2 thereof, the phonograph in its general organization comprises a housing plate or support A which supports all of the parts of the machine, a record turntable B rotatably mounted thereon, a reproducer or tone arm C mounted thereon and movable between the full and dotted line positions shown in Fig. 1, a centrally arranged record support and feeding means D, an edge record supporting means and record engaging member designated together as E, all mounted on the top of the housing plate A, and the operating and controlling apparatus for the phonograph, generally designated as F, mounted on the underneath side of the housing plate.

Figure 3:
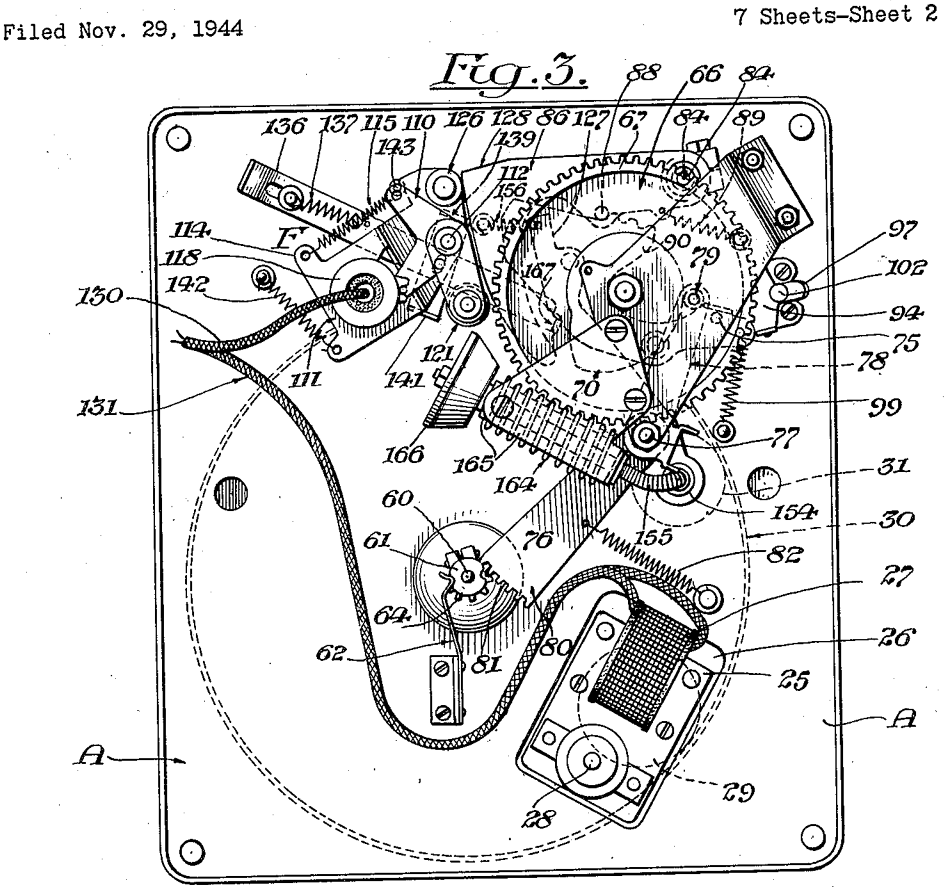
Fig. 3 is a bottom plan view of the phonograph as viewed when the same is rotated 180° around the axis 3, 3 of Fig. 1.
Figures 6, 7, 8:
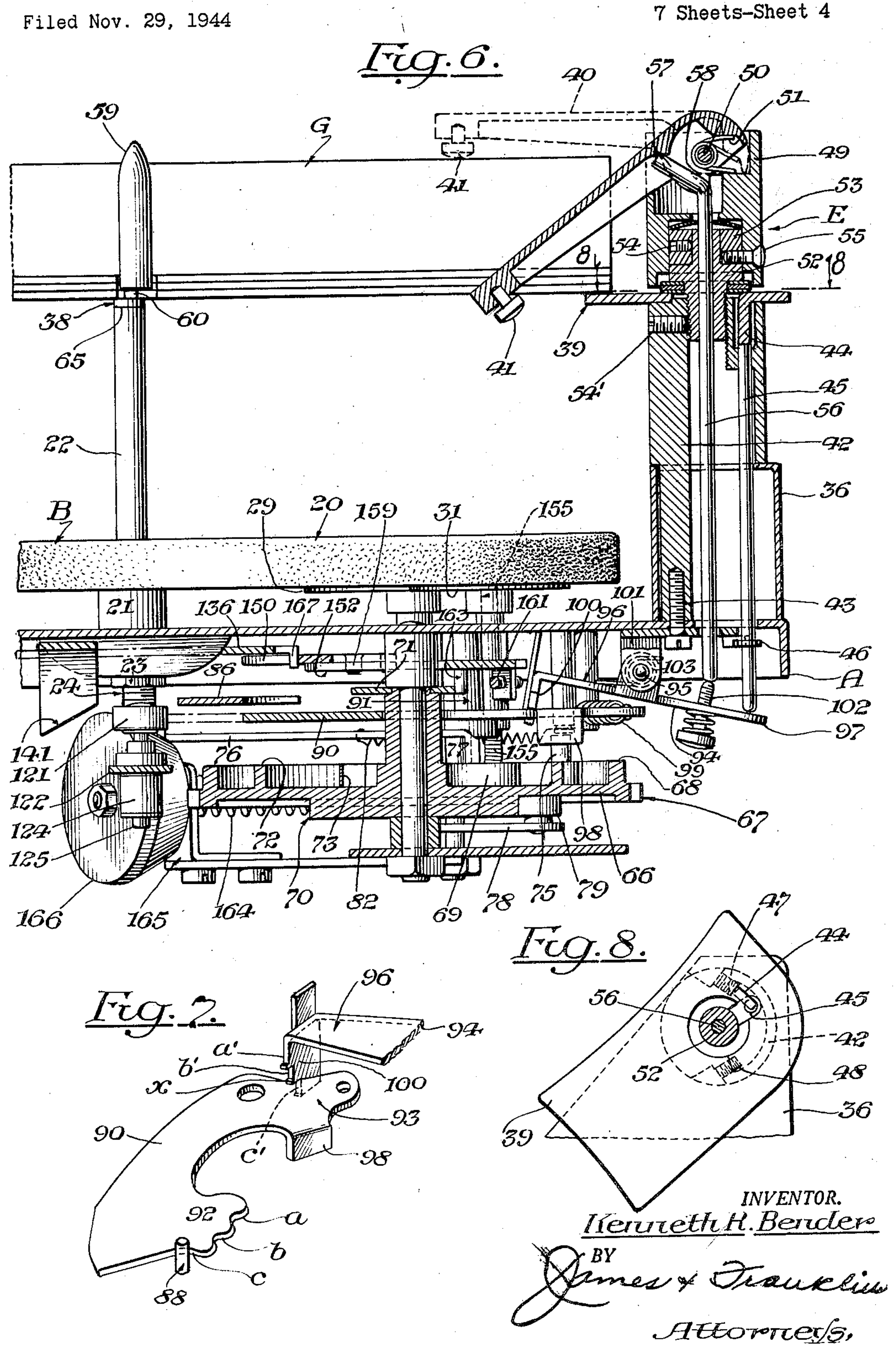
Fig. 6 is a view shown on an enlarged scale taken in cross-section in the plane of the line 6, 6 of Fig. 1 with the record supporting means moved, however, to position to support large size records.
Fig. 7 is a perspective view depicting the relation between the control member and the stop lever of the machine, the swing arm cam follower being also shown.
Fig. 8 is a detail view of the record supporting member or plate of the machine in position for supporting large size records, the view being taken in cross-section in the plane of the line 8—8 of Fig. 6.

The turntable B may comprise an inverted dished member 20 surfaced with a suitable frictional material and provided with a hub 21 rotatably received by a spindle sleeve 22 which is fixed to the housing plate A by means of a nut 23 and the threaded lower end 24 of said sleeve (see Fig. 6). The turntable is directly rotated from an electric motor 25 mounted on a plate 26 and fixed to the housing plate A (see Fig. 3), said motor provided with the field coil 27 having its extending rotor wheel 28 engaging a friction such as a rubber-faced wheel 29 which latter is in engagement with the interior rim 30 of the turntable. Upon energization of the motor the turntable is thus rim rotated in the arrowed direction shown in Fig. 1 of the drawings. The other operating and controlling mechanism of the phonograph, all employed during a record changing cycle, is operated by the rotation of the turntable by means of a friction wheel 31 normally out of engagement with the turntable rim 30, as shown in Fig. 1, and tripped into turntable rim engagement, as shown in Fig. 3, when a record changing cycle is initiated and held in such engagement for the period of this cycle.

Figures 9, 10, 11, 12:
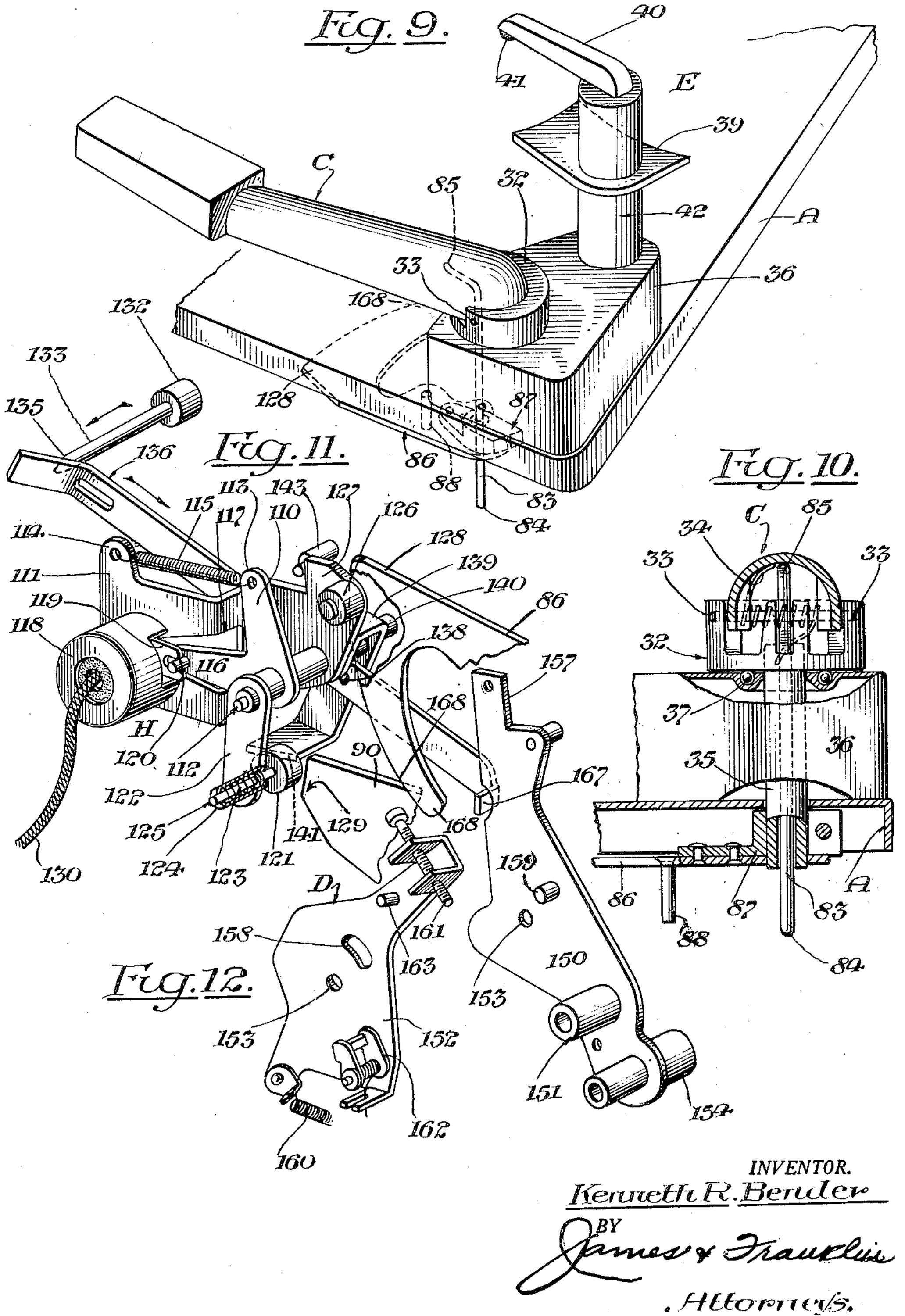
Fig. 9 is a perspective fragmentary view of the machine showing the tone arm and the record support and record engaging means.
Fig. 10 is a view featuring the tone arm support and operating means with parts shown in section.
Fig. 11 is a perspective view of the switch mechanism of the machine.
Fig. 12 is a perspective exploded view of the trip or initiating mechanism of the machine.

The reproducer or tone arm C is mounted as usual for movement about vertical and horizontal axes. As shown in Figs. 1 and 10 of the drawings, the tone arm C is pivotally mounted on a bracket 32 on a pivot pin 33 for movement thereon about a horizontal axis, the weight of the arm being relieved by a spring 34 encircling the pivot pin. The bracket 32 is rotatable about a vertical axis by means of a sleeve 35 (see Fig. 10) attached thereto and extending through an elevating casing 36 and the casing plate A, the said bracket 32 being also preferably mounted for rotation on the ball bearings 37.

*The record supporting means—The magazine*

The magazine of the machine comprises means for supporting a stack of records above the turntable, from the bottom of which stack the individual records are fed to the turntable during a record changing cycle. The record supporting means comprises a spindle support for supporting the record stack at its center and a record supporting plate for supporting the record stack at an edge thereof. The records are individually fed from the bottom of the stack by means embodied in the central spindle support.

Referring now to Fig. 6 of the drawings, a stack of records G is shown supported centrally on a button 38 mounted at the top of the spindle sleeve 22 and peripherally by a supporting plate 39. Associated with the supporting plate 39 is a record engaging member 40 for engaging and following the movement of the top record of the stack G, the said member being provided at its engaging end with a record engaging button 41.

The record supporting plate 39 is movable between the positions shown in Fig. 1 and Fig. 8 for respectively supporting different sized records such as 10″ records and 12″ records. The record engaging member 40, in following the movement of the top record of the stack, moves between record engaging positions, as indicated in dotted lines in Fig. 6 when any one or more records is in the magazine, to a non-engaging position indicated in full lines in Fig. 6 when no record is present in the magazine as when the last record of the stack has been fed to the turntable.

This record supporting means is so constructed and designed that when large records are being supported in and supplied from the magazine the tone arm C will be positioned during a record changing cycle for engaging the starting groove of a large record, when small records are being supported in and supplied from the magazine the tone arm C will be positioned during such a record changing cycle for engaging the starting groove of a small record, and so that when the supply of records has been depleted from the magazine the tone arm during the next changing cycle will be moved to and held in its initial or stopping position so that the machine may be conditioned for being automatically stopped.

To accomplish these results the record supporting plate 39, shaped as shown in Fig. 8, is movable between the position shown in Fig. 1 for supporting small records to the position shown in Figs. 6 and 8 for supporting large records, the said record supporting plate being rotatably mounted on a fixed post 42 extending above the elevating housing 36 and secured at its bottom, as at 43, to the housing plate A. The plate 39 is formed with a depending lug 44 cam-faced at its bottom for engaging a rod 45 slidably mounted at its ends in the post 42 and the plate A. The rod 45 is provided near its bottom with a washer 46 engageable with the underneath wall of the plate A for limiting the upward movement thereof. When the supporting plate 39 is moved to the position shown in Figs. 6 and 8 for supporting large records, the cam lug 44 engages the rod 45 to move the same to the position shown in Fig. 6. When, however, the supporting plate 39 is moved to the position shown in Fig. 1 for supporting small records, the cam lug 44 is moved out of the range of the rod 45 to permit freedom of upward movement of this rod. For limiting the rotation of the supporting plate, stopping the same in the two positions shown respectively in Figs. 1 and 6, stop screws 47 and 48 threaded into the post 42 (see Fig. 8) project into the post so as to be engaged by the sides of the cam lug 44, as clearly pictured in Fig. 8. This rod 45 may be briefly referred to as the record size selector rod, its movement and its operation of control means to be described hereinafter, being responsive to the position to which the record supporting member 39 is manually moved for supporting the different size records.

The record engaging member 40 is mounted for movement about a horizontal axis on the cylindrical mount or bracket 49 by means of the pivot pin 50, a spring 51 encircling said pivot pin functioning to urge the member 40 from an elevated record engaging position to a depressed and finally non-engaging position, both shown in Fig. 6. The mount 49 is itself rotatable about a vertical axis so that the member 40 may be moved from the operative positions shown in Figs. 1 and 6 to an inoperative out of the way position (to permit loading and unloading of the records in the magazine), the mount 49 is accordingly rotatably mounted on a thimble 52 and a collar 53 secured to the thimble by means of a set screw 54, the mount being provided with a screw 55 which enters and moves in an arcuate slot formed in the collar 53. The thimble 52 is in turn fixed to the post 42 by being threadedly mounted in the post and secured in adjusted position by means of a set screw 54′, all as best shown in Fig. 6. Cooperating with the vertical movement of the record engaging member 40 is a rod 56 slidably mounted in the thimble 52 and provided at its top with a bent end 57 which is adapted to be engaged by a part 58 of the member 40 when the latter moves to its descended non-record-engaging position; at all other times the rod 56 is free to move upwardly in its thimble support. This rod 56 being thus responsive to the movement of the record engaging member from a record engaging to a non-engaging position, and being utilized for translating this to an operation to automatically stop the machine after the last record has been played may be briefly referred to as the automatic shut-off rod.

The central record support includes a spindle cap 59 fixed to shaft 60 which is eccentrically mounted in the spindle sleeve 22 whereby the cap may be moved from the eccentric position, shown in Figs. 1 and 6, to a position concentric with the sleeve 22. In its eccentric position the cap 59 receives the record stack G, the bottom-most record of which rests on the button 38. For removing a played stack of records from the turntable the spindle cap 59 is moved to its concentric position (the record engaging member 40 being first preferably moved to its out of the way or inoperative position). For holding the spindle cap 59 in its two positions a collar 61 is fixed to the bottom end of the eccentric shaft 60, the collar being recessed at diametrically opposite points for engagement by a spring 62 (see Fig. 3), the spindle cap 59 being thus held in its two opposite positions by means of this engagement.

The record feeding means is of a type known in the art and is associated with the central spindle support. This record feeding means comprises the top button 38 which is fixed to a sleeve 63 (see Fig. 4) which sleeve surrounds the shaft 60 and is therefore eccentrically mounted in the spindle sleeve 22. To the lower end of this sleeve is fixed an arcuate pinion 64 (see Figs. 3 and 4). Imparting an oscillating cycle to this pinion (the oscillation being over 180°) moves the button 38 through a corresponding oscillating cycle. When this takes place the button 38 moves from its record supporting position, shown in Fig. 6, to a position 180° therefrom and concentric with the spindle cap 59. The record stack therefore drops a distance equal to the thickness of the button 38 (the thickness of a record) and is supported in position by the lowermost record engaging the top shoulder 65 of the sleeve 22. The button 38 is thus located within the hole of the bottommost record. Completing the oscillating cycle, the button 38 moves back to its Fig. 6 position and thereby moves the lowermost record to a position concentric with the spindle sleeve 22; this lowermost record, being thereby freed at its periphery or edge from the supporting plate 39, drops from the magazine onto the turntable or a previously played record thereon. The button 38 in this last cycle of its movement also interposes itself as a support for the remaining records in the stack with the result that the remaining records are then supported in the condition shown in Fig. 6.

*The mechanism for producing a record changing cycle*

In record changing phonographs of this character, mechanism is provided automatically actuatable when the playing of one record is completed for carrying out the following sequence of operations: lifting the reproducer or tone arm from the played record, shifting the tone arm to clear the record area, feeding a new record from the record stack onto the played record or onto the turntable, returning the tone arm to a starting position over the new record, and lowering the tone arm onto or adjacent the starting groove of the new record. This sequence of operations, once set into motion by suitable tripping or initiating means, is carried out by a main cam and mechanism connecting this main cam to the record feeding means and to the tone arm.

Figures 13, 14, 15:
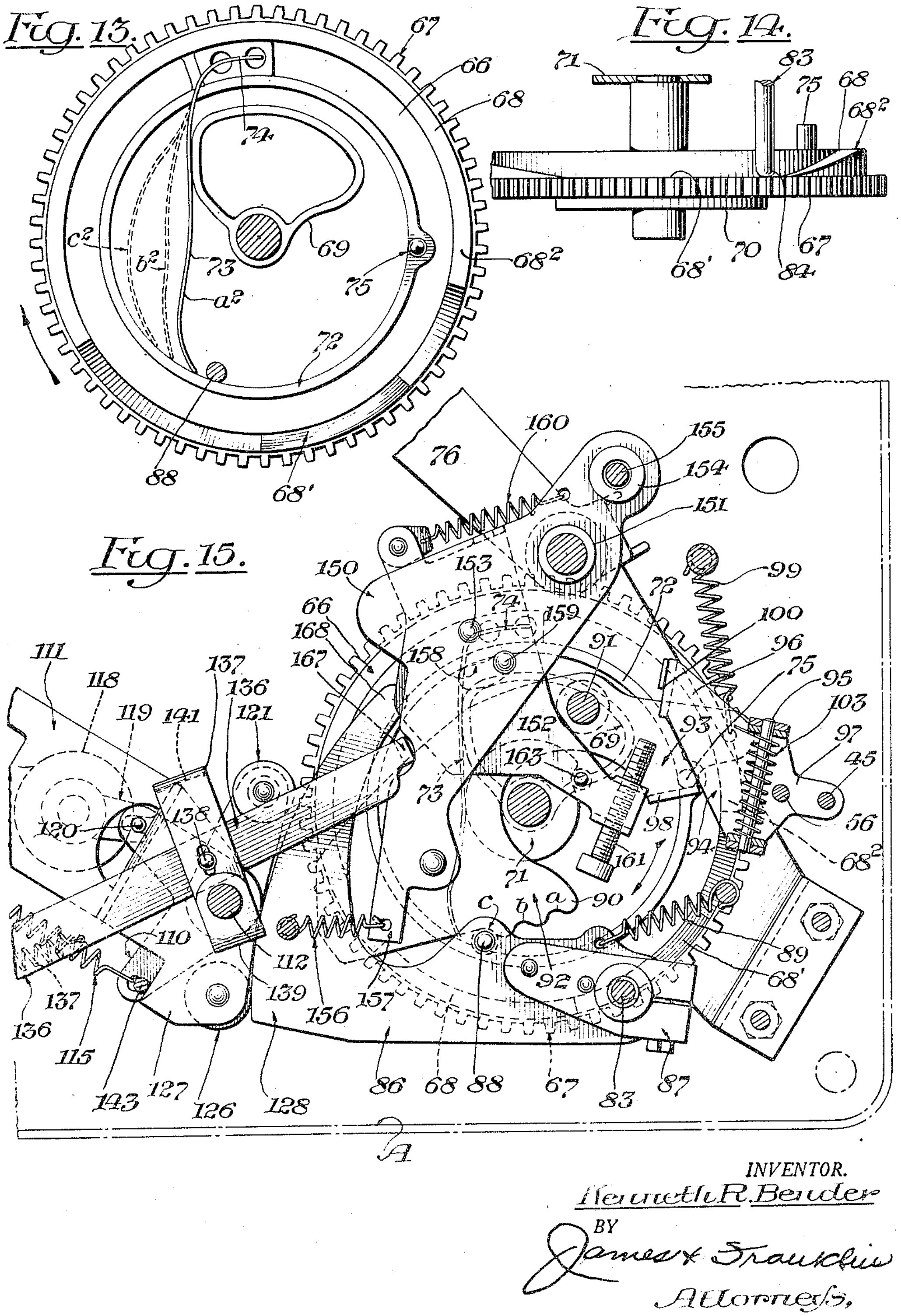
Fig. 13 is a top plan view of the main cam of the machine.
Fig. 14 is an elevational view of the main cam with a part broken away.
Fig. 15 is a top plan view depicting the relation between the apparatus shown in Fig. 5 and the main cam shown in Fig. 13 and showing these parts in a different operating position when compared with Fig. 5.

This main cam is separately shown in Figs. 13 and 14 of the drawings and comprises a disc cam member 66 peripherally toothed as at 67 for cam driving purposes and formed on its top and bottom sides with suitable cam parts. The top side of the cam is formed near its periphery with a circumferential cam face 68 which functions for causing the lifting and descending movements of the tone arm, and is formed interiorly with a cam element 69 which functions for effecting the described shifting movements of the tone arm. On its opposite side the cam 68 is formed centrally with a cam face 70 which functions to operate the record feeding means. The cam member 66 has also attached thereto a small cam member 71 which functions in conjunction with the tripping or initiating means to be described. Attached to the top side of the cam 66 and extending over the area defined by the circular rib 72 thereon is a spring 73 anchored as at 74 and adapted to be moved from the full-line position shown in Fig. 13 to the two dotted line positions shown. Attached to the top side of the cam, and at a point in circumference of the rib 72, is a pin 75 which cooperates with the tripping means of the machine as will be seen hereinafter.

The record feeding means described is operated by the cam element 70 when the cam 66 is moved through its cycle of movement (one complete rotation) by means of a lever 76 (see Figs. 3 and 6) fulcrumed at 77, one arm 78 of which is provided with a pin-shaped cam follower 79 engaging the cam element 70, and the other arm 80 of which is toothed at its periphery 81 for engagement with the pinion 64. A spring 82 connected to the lever 76 moves the same into cam engaging position. When the cam 66 moves through a rotation cycle, the lever 76 is oscillated (when the tone arm has first been shifted to its initial full-line position shown in Fig. 1) for oscillating the eccentric button 39 of the record feeding means, thereby feeding the lowermost record of the stack to the turntable.

For causing the lifting and descending movements of the tone arm there is provided a rod 83 slidable in the tone arm bracket sleeve 35, the lower end 84 of which forms a cam follower, and the upper bent end 85 of which is adapted to engage the inner wall of the tone arm C. The cam 66 is so mounted that in its rotation its peripheral cam face 68 rides under the rod cam follower 84 (see, for example, Fig. 14). The cam face 68 from a depressed part 68′ rises at opposite ends to an elevated part $68^2$. Normally the parts are in the position as shown in Fig. 14, the tone arm being in its lowered operative position. When the cam 66 is moved through a rotating cycle, moved in the clockwise direction depicted in Fig. 13, the cam follower 84 rides to the elevated portion of the cam face 68, thus lifting the tone arm from its engagement with a played record and maintains the tone arm in this lifted condition until the tone arm has been shifted by the means, presently to be described, to its record starting position (if there is a record to be played), the movement of the rod cam follower from the elevated to the depressed cam position then functioning to drop or lower the tone arm onto or adjacent the starting groove of a new record.

Figure 5:
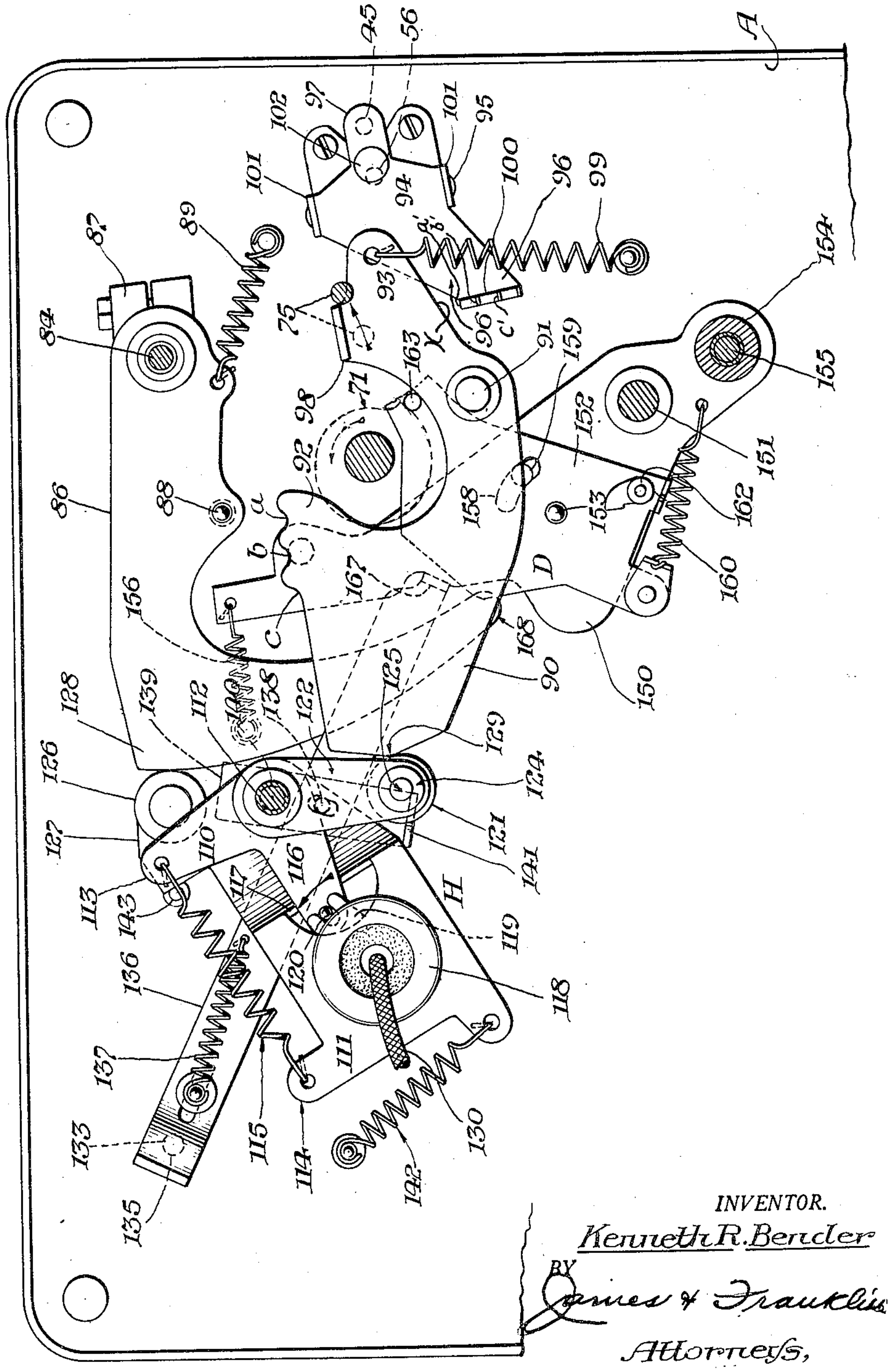
Fig. 5 is a view similar to those of Figs. 3 and 4 drawn to an enlarged scale and showing, in the normal inoperative condition, the following parts of the machine: the switch mechanism, the sweep arm, the stop lever, the cam pin and the control lever.

For causing the shifting movement of the tone arm there is secured to the bottom of the tone arm sleeve 35 a sweep arm 86 secured thereto by means of a bracket 87 (see particularly Fig. 10), the said sweep arm, shaped as best shown in Fig. 5, being provided with a cam follower pin 88. This cam follower pin is moved by the cam element 69, from the terminal playing position shown in dotted lines in Fig. 1, to the initial position shown in full lines in this figure, and then to a record starting position (if a record is on the turntable), the spring 73 of the cam, together with other controlling means, acting to determine any one of three positions into which the tone arm may be moved, as will be further described hereinafter. It may be stated here that when the playing of a record has been finished and the sweep arm 86 is in its innermost position, a rotation cycle of the main cam 66 causes the cam element 69, moving sequentially into the positions shown in Fig. 16 and Fig. 17 of the drawings, to engage the sweep arm cam follower 88 and to thereby move the sweep arm and its tone arm outwardly to the positions shown in these figures, and to the outermost position shown in Fig. 15 (also shown in dotted lines in Fig. 16), and then, by means of the spring 73, to positions determined by the controlling apparatus later to be described. The sweep arm 86 is desirably assisted in its inward swinging movement by means of a spring 89 connected thereto.

*Controlling mechanism for determining tone arm position*

The machine embodies controlling mechanism for determining the position of and for positioning the tone arm during a record changing cycle in the following three positions: a starting position for a large record when large records are being supported in and supplied from the magazine of the machine, a starting position for a small record when small records are being supported in and supplied from the magazine, and an initial or stopping position when there is no record in, as when the supply of records has been depleted from the magazine.

The controlling mechanism for accomplishing this is best shown in Figs. 3 to 7 of the drawings. Fig. 5 shows the same schematically when the parts are in a normal position (when the main cam is at rest) and Figs. 3, 4, 6 and 7 show the condition which these parts assume immediately after the main cam has been set into its cycle of rotation, in the absence of any more records in the magazine.

Referring first to Fig. 5 of the drawings which show the parts in a normal rest position, the controlling mechanism comprises a stop member in the form of a stop lever 90, fulcrumed as at 91, provided with a stop arm 92 and with a cam-operated arm 93 with which is associated a controlling member in the form of a control lever 94 fulcrumed at 95 and providing the positioning arm 96 and an operating arm 97.

The main cam pin 75 normally assumes the full-line position shown in Fig. 5, and in this position the pin is in engagement with a lip 98 formed in the stop lever arm 93. Towards the end of a cycle rotation of the cam the cam pin 75 moves in the arrowed direction from the dotted to the full-line position shown in Fig. 5, and by its engagement with the lip 98 moves the stop lever to its outermost position, as shown, against the action of a tensioning spring 99. The arm 92 of the stop lever is formed with three stop depressions *a*, *b*, *c*, each adapted to be engaged by the sweep arm pin 88, depending upon the position assumed by the stop lever, such engagement functioning to intercept and stop the sweep arm and thereby the tone arm in its inward sweep. Normally these parts are out of engagement, as shown in Fig. 5.

The control lever arm 96 is formed with the stepped part 100 providing the three steps *a′*, *b′* and *c′*, also well shown in Figs. 6 and 7 of the drawings. These three stepped parts are adapted to be selectively engaged by the stop lever 90 at a position indicated as X thereon. The control lever 94, pivotally mounted on a bracket 101 (see Fig. 6), is operated by the rods 45 and 56 of the record supporting means into any one of three positions corresponding to the interposition of the steps *a′*, *b′* and *c′* thereof to the movement of the stop lever 90, thereby determining the positioning of the stop lever in any one of three positions.

The correspondence between the record supporting means E, the control member or lever 94, the stop lever 90 and the sweep arm 86 of the tone arm is as follows: when a small record is being supported in and supplied from the magazine both actuating rods 45 and 56 are free to move upwardly in their mounts and are so moved by the engagement at the lower ends thereof by the arm 97 of the control lever 94, the arm directly engaging the rod 45 and an adjustable screw 102 engaging the rod 56, the parts being moved by a spring 103 which is carried by the pivot pin 95, the control lever 94 being moved in this instance to a position where the step *a'* is in a position to intercept the stop lever. When the stop lever is so intercepted the stop groove *a* thereof is in a position to intercept the sweep arm pin 88 and thus to intercept the tone arm in a starting position for small records. When large records are being supported in and supplied from the magazine the record supporting plate 39 is moved to its Fig. 8 position, in which event the rod 45 is depressed to move the control lever 94 so that its step *b'* is in a position to intercept the stop lever; in this intercepted position of the stop lever its stop groove is in a position to intercept the sweep arm pin 88 to stop the sweep arm and its tone arm at the starting groove for large records. When the last of the records in the stack has been fed from the magazine and the magazine is depleted, the record engaging member 40 moves to its descended inoperative position shown in Fig. 6, and this movement causes the shut-off rod 56 to descend and thereby move the control lever 94 to the position as shown in Figs. 6 and 7 with the stop *c'* in a position to intercept the stop lever 90; and in this instance the stop groove *c* of the lever is positioned to intercept the sweep arm pin 88, and thereby the tone arm, to hold the same in its outward initial or stopping position.

A complete cycle of operation of this controlling mechanism may now be described. Before the operation of the main cam is initiated the control member or lever 94 has been selectively moved to one of its three positions corresponding to a small record, a large record and no record in the magazine. When the main cam begins its cycle of rotation its pin 75 moves from the stop lever lip 98 and releases the lever for movement in response to the spring 99. The stop lever moves in any one of the three positions determined by the control lever. At this time the stop lever and the sweep arm are in the positions as shown, for example, in Fig. 16. The movement of the sweep arm outwardly to tone arm initial position is permitted by the stop lever, the pin 88 at this time engaging the stop lever in the manner shown in Fig. 17, and moving the stop lever out of the way, the stop lever immediately moving back to its controlled position after the pin 88 has passed the same. Assuming the absence of a record in the magazine, the stop lever 90 takes the position shown in Figs. 3 and 4, the sweep arm being thereby intercepted in its outermost initial or stop position (the *c* position). The spring 73 of the main cam permits this to take place, this spring being depressed by engagement with the pin 88 into the position $c^2$ shown in Fig. 13. The main cam continues its cycle of rotation at the end of which the cam pin 75, assuming the dotted line position shown in Fig. 5, again engages the lip 98 of the stop lever and thereby moves the stop lever against the tension spring 99 to its original or normal position, as shown in Fig. 5, leaving the tone arm now free to move or be moved for any of its further operations.

With a large record in the magazine, the sweep arm pin 88 is intercepted by the stop groove *b* of the stop lever, and in this event, after the sweep arm has been moved by the main cam to its outermost or initial position, the tone arm is returned to a starting position for large records by the action of the cam spring 73 which assumes the position $b^2$ shown in Fig. 13. When the final movement of the cam pin 75 returns the stop lever to its normal Fig. 5 position, the sweep arm and its tone arm are freed for an inward record playing movement. With a small record in the magazine the sweep arm pin 88 is intercepted by the stop groove *a* of the stop lever, and in this event, after the sweep arm has been moved by the main cam to its outermost or initial position, the tone arm is returned to a starting position for small records by the action of the cam spring 73 which assumes the position $a^2$ shown in Fig. 13. Again, when the final movement of the cam pin 75 returns the stop lever to its normal Fig. 5 position, the sweep arm and its tone arm are freed for an inward record playing movement.

Figure 4:
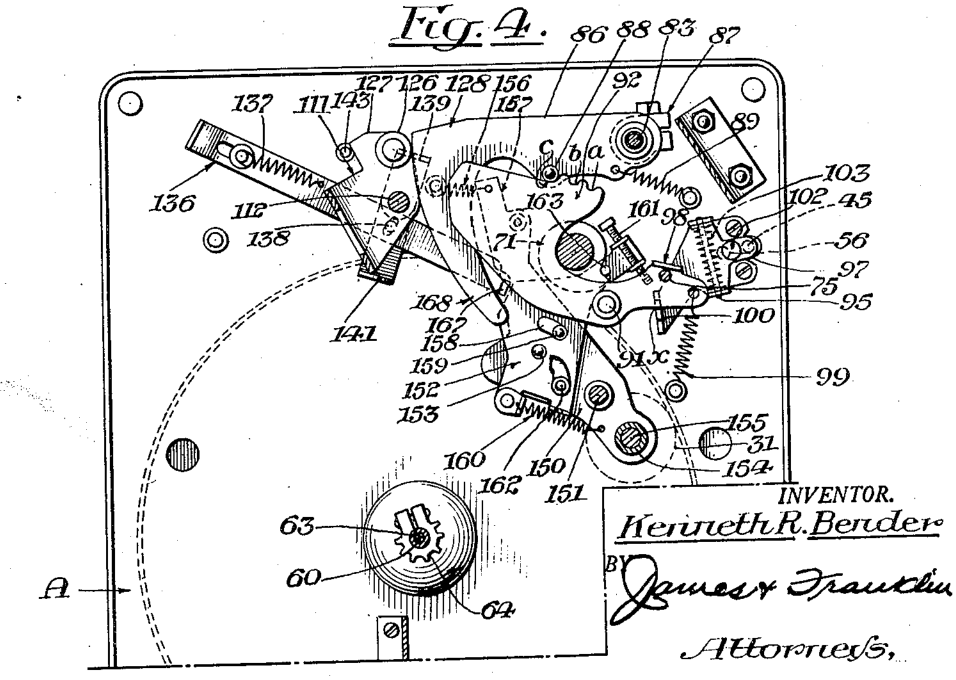
Fig. 4 is a similar view thereof with some of the parts removed.

In the devised construction the stop element *c'* may be eliminated or cut off so that in the third or *c'* position of the control lever 94 the stop lever may then stop against the hub of the cam 66 as will be clear from an inspection of Fig. 4 of the drawings. The functioning of the combination is the same as just described. The control lever 94 takes its *c'* position and the stop lever 90, when stopped by the hub of the cam, correspondingly takes its *c* position.

The steps of the stop elements *a'* and *b'* are subtended by short ledges best shown in Fig. 7 of the drawings which act to latch the control lever 94 against the engaged edge of the stop lever 90 when the machine is about to be operated to its stopping or shut-off position. When a last record of the record stack drops from the magazine the stop lever 90 is in engagement with either of the stop elements *a'* or *b'*. When the last record drops, the lever 94 will tend to rotate on its pivot or axis to its shut-off or *c'* position but is prevented from so doing until the end of the cycle by the said ledges which are latched against the edge of the stop lever 90. It will be understood that without these latching elements the control lever 94 would rotate at once when the last record dropped, which would shut off the mechanism at the end of the cycle without playing the last record.

*Switch mechanism, its operation and control*

The machine embodies a switch mechanism and means for operating and controlling the same, designed and constructed to accomplish the following operative possibilities with the use of relatively simple apparatus: (*a*) the machine may be set automatically into operation by manually picking up the tone arm and moving the same to a record starting position provided that there is a record on the turntable, (*b*) the machine may also be set automatically into operation by simply depressing the tone arm in its initial or stop position, with the normal operation of the machine continued provided there is a record to be fed to the turntable, and (*c*) the machine will be automatically stopped after the last record of the magazine stack has been fed to the turntable and played.

These operations are accomplished by the provision of a switch mechanism and its combination with the controlling mechanism of the machine, which is best shown in Figs. 5 and 11 of the drawings, where a switch assembly generally designated as H is shown combined with the controlling mechanism and, particularly, the swing arm 86 and the stop lever 90.

The switch mechanism comprises two levers, namely, a lever 110 and a lever 111, both fulcrumed on the same pivot 112, an arm 113 of lever 110 and an arm 114 of lever 111 being connected together by means of a spring 115. These levers are relatively movable within limits, the limits being determined by the stop engagement of an arm 116 formed on lever 110 with the walls of a cut-out portion 117 formed in the lever 111 (see Fig. 11). The levers are movable between the lever contracted condition shown in Fig. 11 to the lever expanded condition shown in Fig. 5, the contracted condition being effected under the influence of the tensioning spring 115. Lever 111 carries an electric switch 118 provided with a movable switch operating element 119, and lever 110 carries on its arm 116 a switch operating pin 120. These parts are so related that when the levers are moved to the expanded condition shown in Fig. 5 the switch elements are moved relatively to each other in one direction (indicated by arrows in Fig. 5) to move the switch 118 to the "off" position and so that when these levers are moved by the spring to the lever contracted condition shown in Fig. 11 the switch elements are moved relatively to each other in the opposite direction to move the switch 118 to the "on" position.

For operating the switch levers, the lever 110 is provided with a cam roller 121 journaled on an arm 122 forming part of the lever 110, the cam roller 121 being, however, mounted in its bearing so as to permit axial movement thereof and moved to its outward position under the influence of a spring 123 housed by the bearing 124 and active on the shaft 125 of the cam roller; and the lever 111 is provided with a cam roller 126 journaled on an arm 127 of said lever. These cam rollers, and hence the levers of the switch mechanism, are operated by the engagement therewith of parts of the sweep arm 86 and the stop lever 90. Thus the sweep arm 86 is shaped to provide a cam part 128 for cooperating with the cam roller 126, and the stop lever 90 is shaped to provide a cam part 129 cooperating with the cam roller 121.

Figures 16, 17:
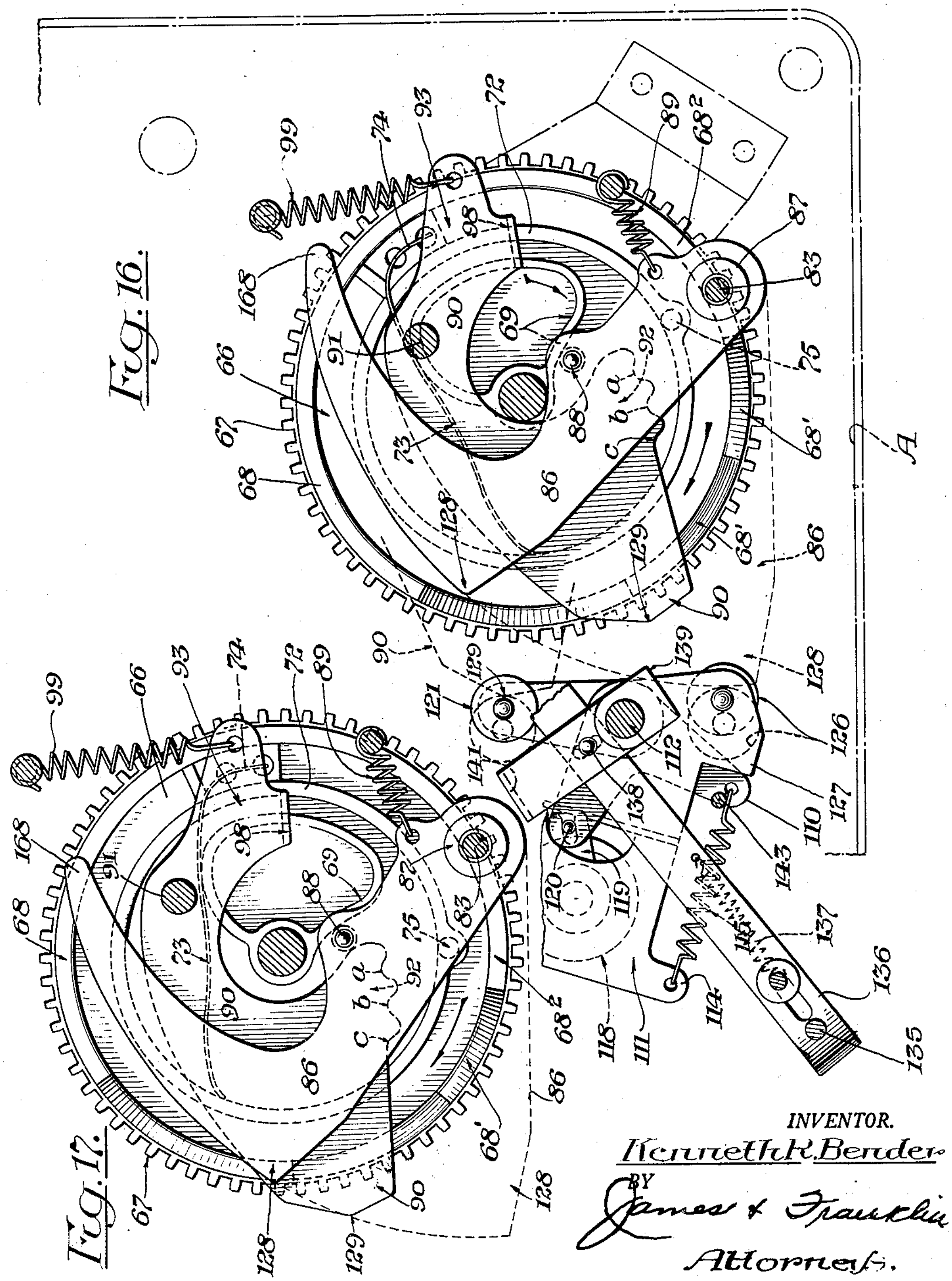
Fig. 16 is a view similar to Fig. 15 and showing the parts in another operating position.
Fig. 17 is a view of parts shown in Fig. 16 showing certain parts thereof in still another position of operation.

Briefly stated, the essential cooperation between the lever cam rollers and the cam parts of the sweep arm and the stop lever is such that the double engagement of the cam rollers by the sweep arm and the stop lever, as shown in Fig. 5 of the drawings, is effective for moving the switch assembly to its expanded condition, and therefore, for moving the switch to its "off" position, and the disengagement of one of the cam rollers by either the sweep arm cam part or the stop member cam part alone is effective for moving the switch assembly to a contracted condition, and therefore, to move the switch to the "on" position, as is illustrated by the condition assumed as shown in Fig. 11, or the different condition assumed as shown in Fig. 15 (in which connection see also Fig. 16). These principles will now be described in connection with the different operating possibilities of the machine, Fig. 5 shows the normal or inoperative condition of the machine. Both the sweep arm part 128 and the stop lever part 129 respectively engage the cam rollers 126 and 121. In this position the levers 110 and 111 have been moved to the lever expanded condition and the switch 118 is open. This switch is connected in the power circuit in series with the field coil 27 of the motor by means of the conductors or connecting leads 130 and 131 (see Fig. 3). The circuit to the operating motor is therefore open. The machine, as aforesaid, may be started by lifting the tone arm and positioning the same at the starting groove of a record. So moving and lifting the tone arm manually causes the inward movement of the sweep arm 86. As soon as the sweep arm 86 is moved inwardly (see Fig. 5) the sweep arm cam part 128 moves past and releases the cam roller 126, permitting the lever 111 to move under the influence of the contracting spring 115 whereby the lever assembly is operated to its contracted condition (the condition shown in Fig. 11). The switch 118 is thus operated to the "on" position, closing the circuit to the motor and starting the operation of the machine. The machine may also be started by merely depressing the tone arm when the same is in its initial position shown in Fig. 1. The tone arm normally rests on a reject button 132. This button is fixed to a pin 133 (see also Fig. 2) slidably movable in a support 134, and the lower end 135 of the pin is adapted to engage the inclined part of a trip bar 136 which is normally moved to an inoperative position by means of the spring 137. This trip bar is pivotally connected at 138 to a lever 139 fulcrumed at 140 on the housing plate of the machine, and this lever is provided with a forward cam part 141 adapted to engage the cam roller 121 to move the same inwardly in its axial mounting. The depression of the tone arm thus moves the trip bar, these parts operating in the arrowed directions shown in Fig. 11, and the lever 139 is thus actuated to move the cam roller 121 axially, thereby freeing the same from engagement with the stop lever cam part 129. As soon as this happens the lever assembly is also moved to its contracted condition, thereby moving the switch to its "on" position starting the phonograph motor. It is this condition and this operation which are depicted in Fig. 11 of the drawings. The spring 137 is utilized to restore the reject button and the trip bar to their normal positions.

This switch mechanism and its control mechanism also operate automatically to stop the machine after the last record of a stack has been fed and played, and further operate to otherwise permit continued operation of the machine. The operation may be explained by reference to a cycle change, assuming the completion of the playing of a record with one record remaining in the stack to be fed and played. At the end of the playing of a record, the sweep arm 86 is in its innermost position as shown in full lines in Fig. 16, and the stop arm 90 is in its outermost position as indicated in dotted lines in Fig. 16, the switch assembly being then in its contracted condition with the switch on. As soon as the main cam moves, the stop lever 90 is spring-actuated to the position shown in full lines in Fig. 16, the cam part 128 of the same thus releasing the cam follower 121, this taking place without, however, changing the condition of the lever assembly. The lever assembly as a whole is capable of partial rotation on its fulcrum pin 112, assisted in one direction by a spring 142 and stopped in both directions by a stop pin 143 which engages the angle walls of part of the lever 111. In the continued rotation of the main cam the sweep arm 86 moves from the position shown in Fig. 16 through the position shown in Fig. 17 and to the position shown in Figs. 5 and 15, the cam part 128 thereof engaging the cam roller 126, this engagement merely causing the switch assembly to move as a whole about its fulcrum pivot from the position shown in Fig. 16 to that shown in Fig. 15, the "on" operation of the switch being thus maintained. It will be noted that at this time the stop arm 90 is in one of its tone arm stopping positions. In the continued rotation of the main cam the sweep arm is moved inwardly to tone arm record starting position, thus releasing the cam roller 126, the switch assembly as a whole thereby returning to its Fig. 16 position. In the final increment of operation of the main cam the stop lever is returned to its normal inoperative position, and in its return its cam part 129 again engages the cam roller 121, thereby again moving the switch assembly as a whole, and thus without changing the operation of the switch. At this time the sweep arm is at a tone arm starting position and the tone arm is ready for a playing operation. The last assumed record of the stack has, during this cycle, been fed to the turntable. On the next operating cycle of the cam all of these described operations again take place except the sweep arm and its tone arm are held by the stop lever in its outermost position and are not thereafter moved by the main cam to any record starting position. At the final increment of movement of the main cam the stop lever is returned to its normal inoperative position and, therefore, at this time both the sweep arm and the stop lever are in their inoperative positions shown in full line in Fig. 5, and the cam parts thereof both engage the cam followers of the lever assembly, thereby moving the lever to its expanded condition and the switch to its "off" position. Thus, after the last record has been played, all of the parts including the tone arm are automatically returned to their initial or stop position and the phonograph motor is automatically turned off and the machine automatically stopped.

*The initiating or trip mechanism*

The initiating or trip mechanism functions to initiate or trip the main cam for its change of record cycle. The initiating mechanism is automatically set into operation when the tone arm reaches the end playing groove of a record, and may be manually set into operation by the user actuating the reject button whenever the user desires a change of record. After the main cam has made its complete cycle (a full rotation of the cam) the initiating or trip mechanism is automatically restored, ready for the next tripping operation.

The initiating or trip mechanism and its associated parts are best shown in Figs. 3, 4, 12 and 15 of the drawings. The trip mechanism comprises a carrier lever 150 fulcrumed at 151 on the housing plate A and a trip lever 152 pivoted to and carried by the carrier lever at the pivot axis 153. The carrier lever is provided with a bearing 154 in one of its arms in which rotates a flexible shaft 155 carrying at its outer end the rubber wheel 31 heretofore mentioned which is adapted to be operated by the turntable rim 30. A tension spring 156 is active on the outer arm 157 of the carrier lever 150. The trip lever 152 has a limited pivotal motion on the carrier lever, limited by the slot 158 in the former receiving the pin 159 on the latter. A spring 160 connects the levers 150 and 152 to normally move the trip lever 152 on the carrier lever to the position shown in Fig. 4. The trip lever 152 also carries in one of its arms a trip screw 161 and may be provided in the other of its arms with a spring reset trip pawl 162. The trip lever 152 is also provided with a cam pin 163 near its trip screw 161, which is positioned to cooperate with the small cam 71 heretofore mentioned fitted to the hub of the main cam 66.

The flexible shaft 155 is in turn attached to a worm 164 (see Fig. 3) journalled in the bracket 165, and the worm meshes with the teeth 67 (forming a worm wheel) of the main cam 66. Normally the rubber wheel 31 is disengaged from the turntable rim (Fig. 1) and the main cam is, therefore, at rest. Upon a tripping operation, the rubber wheel 31 is tripped into engagement with the turntable rim and is consequently operated thereby to impart motion, by way of the flexible shaft 155, worm 164, and worm wheel 67, to the main cam 66. The main cam continues its motion (one complete revolution) until the rubber wheel 31 is again automatically disengaged from the turntable rim. Preferably, the shaft of the worm 164 is provided with a small fly wheel 166 for steadying purposes.

The parts assume the position shown in Figs. 3, 4 and 15 at the final increment of movement of the main cam 66 (at the end of a record changing cycle). During the increment of movement the small cam 71 engages and moves the cam pin 163 causing the trip lever 152 to act as a drag bar. The trip lever thereby drags or pulls the carrier lever 150 about its fulcrum 151 to disengage the rubber wheel 31 from the turntable rim. In doing so, the spring 156 acting on the carrier is tensioned. The disengagement of the carrier wheel terminates the rotation of the main cam and hence its operating cycle. The parts are then in position for one of the tripping operations.

Tripping is accomplished by an incremental movement of the trip lever 152. The trip lever may be given such movement in several ways. Inward movement of the tone arm C to the finishing groove of a record causes the sweep arm 86 to engage the trip screw 161 (which lies in its path), and then moves the trip lever 152 about its pivot on the carrier lever, against the action of the spring 160, the movement being limited by the pin and slot 159, 158. The cam pin 163 is also thereby moved out of the cam groove and onto the high point of the cam 71. The previously imposed drag on the trip lever is also thereby relieved, and the carrier lever 150 is thereby freed to move under the influence of its spring 156 to cause the rubber roller 31 to engage for driven connection to the turntable rim. The rotation of the main cam is thereby begun. The spring 160 restores the trip lever to its normal position on the carrier lever, as permitted by the decline of the cam to its low point, the spring serving to keep the pin in engagement with the cam. The condition shown in Figs. 3, 4 and 15 is finally reached towards the end of the cycle when the final increment of movement of the main cam above described then takes place.

The trip lever may also be manually tripped by operation of the reject button 132, as when the user desires to effect a change of record. For this purpose the trip bar 136 is provided with an extension 167 located to engage an edge of the trip lever 152 and to move the same (upon depression of the reject button) in a manner similar to that when the trip screw 161 is engaged by the sweep arm. Means is also provided to permit the trip lever to be tripped when records are used having eccentric finishing grooves which set the tone arm oscillating at the finish of a record. For this purpose the spring reset trip pawl 162 on the trip lever is provided (see Figs. 4 and 5) and the sweep lever 35 is shaped to provide a finger extension 168 for engaging the same when the tone arm reaches a record eccentric finishing groove. An oscillation of the sweep lever thus causes tripping movement of the trip lever about its pivot.

The operation of the record changer phonograph of the present invention, under the various conditions of service and use, will be evident from the description of the operation of the main component sections thereof given above; and therefrom it will now be apparent that all of the objects of the invention above described are achieved. It will also be apparent that the inventive principles may be embodied in different constructional forms, the preferred form herein described and shown being only exemplary thereof, and, therefore, that many constructional changes may be made without departing from the essence and spirit of the invention defined in the following claims.

I claim:

1. In a record changer phonograph having a turntable, a magazine, a tone arm, and a motor for operating the phonograph, an electric switch for the motor, means for operating the switch to "on" and "off" positions, a sweep arm fixed to the tone arm and oscillatable therewith, a stop member movable from an inactive position to intercept and stop the sweep arm on the inward sweep of the tone arm in at least the following two tone arm positions: an initial and stop position corresponding to no record being present in the magazine and a record starting position corresponding to a record being present in the magazine, the sweep arm having a part engageable with the switch operating means for actuating the latter during movement of the sweep arm, and the stop member having a part engageable with the switch operating means for actuating the latter during movement of the stop member.

2. The combination of claim 1 in which the switch operating means comprises two relatively movable elements, one engageable by the sweep arm part when the tone arm is in its initial and stop position and the other engageable by the stop member part when the latter is in its inactive position, these parts being related so that such engagement by both the sweep arm part and the stop member part moves the switch to the "off" position and disengagement of one of said switch operating elements by either the the sweep arm part or the stop member part moves the switch to the "on" position.

3. In a record changer phonograph having a turntable, a magazine, a tone arm, and a motor for operating the phonograph, an electric switch for the motor, means embodying two relatively movable elements for operating the switch to "on" and "off" positions, a sweep arm fixed to the tone arm and oscillatable therewith, a stop member movable from an inactive position to positions to intercept and stop the sweep arm in its inward sweep in at least the following two tone arm positions: initial and stop position corresponding to no record being present in the magazine and a record starting position corresponding to a record being present in the magazine, the sweep arm having a part engageable with one of said switch operating elements when the tone arm is in its initial and stop position, and the stop member having a part engageable with the other switch operating element when the stop member is in its inactive position, the double engagement of said switch operating elements being effective for moving the switch to its "off" position.

4. The combination of claim 3 in which the disengagement of one of the switch operating elements by either the sweep arm part or the stop member part moves the switch to the "on" position.

5. In a record changer phonograph having a turntable, a magazine, a tone arm, and a motor for operating the phonograph, an electric switch for the motor, means for operating the switch to "on" and "off" positions, a sweep arm fixed to the tone arm and oscillatable therewith, a stop member movable from an inactive position to positions to intercept and stop the sweep arm in its inward sweep in at least the following two tone arm positions: initial and stop position corresponding to no record being present in the magazine and a record starting position corresponding to a record being present in the magazine, the sweep arm having a part engageable with the switch operating means when the tone arm is in its initial and stop position, the stop member having a part engageable with the switch operating means when the stop member is in its inactive position, the double engagement of said switch operating means being effective for moving the switch to its "off" position, and the disengagement of the switch operating means by either the sweep arm part or the stop member part alone being effective for moving the switch to the "on" position, and manual means for disengaging the stop member part from the switch operating means to start the phonograph, manual inward movement of the tone arm causing the sweep arm part to disengage the switch operating means for also starting the phonograph.

6. In a record changer phonograph having a turntable, a magazine, a tone arm, and a motor for operating the phonograph, an electric switch for the motor, means embodying two relatively movable elements for operating the switch to "on" and "off" positions, a sweep arm fixed to the tone arm and oscillatable therewith, a stop member movable from an inactive position to positions to intercept and stop the sweep arm in its inward sweep in at least the following two tone arm positions: initial and stop position corresponding to no record being present in the magazine and a record starting position corresponding to a record being present in the magazine, the sweep arm having a part engageable with one of said switch operating elements when the tone arm is in its initial and stop position, the stop member having a part engageable with the other switch operating element when the stop member is in its inactive position, the double engagement of said switch operating elements being effective for moving the switch to its "off" position, and the disengagement of one of the switch operating elements by either the sweep arm part or the stop member part alone being effective for moving the switch to the "on" position, and manual means for disengaging the stop member part from its switch operating element to start the phonograph, manual inward movement of the tone arm causing the sweep arm part to disengage its switch operating element for also starting the phonograph.

7. In a record changer phonograph having a turntable, a magazine, a tone arm, and a motor for operating the phonograph, an electric switch for the motor, means embodying two relatively movable levers for operating the switch to "on" and "off" positions, a spring connecting the levers to move the same to a contracted condition and the switch to an "on" position, a sweep arm fixed to the tone arm and oscillatable therewith, a stop member movable from an inactive position to positions to intercept and stop the sweep arm in its inward sweep in at least the following two tone arm positions: initial and stop position corresponding to no record being present in the magazine and a record starting position corresponding to a record being present in the magazine, the sweep arm having a part engageable with one of said switch operating levers when the tone arm is in its initial and stop position, and the stop member having a part engageable with the other switch operating lever when the stop member is in its inactive position, the double engagement of said switch operating levers being effective for moving the levers to an expanded condition against the action of said spring and the switch to its "off" position.

8. In the combination of claim 7, manual means for disengaging the stop member part from its switch operating lever to permit the levers to move to their contracted condition to start the phonograph, manual inward movement of the tone arm causing the sweep arm part to disengage its switch operating lever to permit the levers to move to their contracted condition to also start the phonograph.

9. In a record changer phonograph having a magazine, a tone arm, a main cam and a motor for operating the phonograph, an electric switch for the motor, means for operating the switch to "on" and "off" positions, a sweep arm fixed to the tone arm and oscillatable therewith, means whereby a cycle operation of said cam moves the sweep arm to and from a tone arm initial and stop position corresponding to no record being present in the magazine, a stop member, and means whereby the cycle movement of said cam moves the stop member from and back to an inactive position, the sweep arm having a part engageable with the said switch operating means when the tone arm is in its initial and stop position, and the stop member having a part engageable with the switch operating means when the stop member is in its inactive position, the double engagement of said switch operating means being effective for moving the switch to its "off" position.

10. In a record changer phonograph having a magazine, a tone arm, a main cam and a motor for operating the phonograph, an electric switch for the motor, means embodying two relatively movable elements for operating the switch to "on" and "off" positions, a sweep arm fixed to the tone arm and oscillatable therewith, means whereby a cycle operation of said cam moves the sweep arm to and from a tone arm initial and stop position corresponding to no record being present in the magazine, a stop member, and means whereby the cycle movement of said cam moves the stop member from and back to an inactive position, the sweep arm having a part engageable with one of said switch operating elements when the tone arm is in its initial and stop position, and the stop member having a part engageable with the other switch operating element when the stop member is in its inactive position, the double engagement of said switch operating elements being effective for moving the switch to its "off" position.

11. The combination of claim 9 in which the disengagement of the switch operating means by either the sweep arm part or the stop member part alone moves the switch to the "on" position.

12. In a record changer phonograph having a magazine, a tone arm, a main cam and a motor for operating the phonograph, an electric switch for the motor, means embodying two relatively movable elements for operating the switch to "on" and "off" positions, a sweep arm fixed to the tone arm and oscillatable therewith, means whereby a cycle operation of said cam moves the sweep arm to and from a tone arm initial and stop position corresponding to no record being present in the magazine, a stop member, means whereby the cycle movement of said cam moves the stop member from and back to an inactive position, the sweep arm having a part engageable with one of said switch operating elements when the tone arm is in its initial and stop position, and the stop member having a part engageable with the other switch operating element when the stop member is in its inactive position, the double engagement of said switch operating elements being effective for moving the switch to its "off" position, and the disengagement of one of the switch operating elements by either the sweep arm part of the stop member part alone being effective for moving the switch to the "on" position, and manual means for disengaging the stop member part from its switch operating element to start the phonograph, manual inward movement of the tone arm causing the sweep arm part to disengage its switch operating element for also starting the phonograph.

13. A record changer phonograph comprising in combination, a turntable, a tone arm, a magazine for holding a stack of records above the turntable, a sweep arm fixed to the tone arm and oscillatable therewith, a stop lever movable to intercept and stop said sweep arm, a main cam, means whereby a cycle operation of said main cam moves the sweep arm to and from a tone arm initial position corresponding to no record being present in the magazine and moves the stop lever from and to an inactive position, a record engaging member in the magazine, the record engaging member being movable between a record engaging position when a record or records is in the magazine and a non-engaging position when no record is present in the magazine, a control member operable by the movement of the record engaging member into its non-engaging position for positioning the stop lever to intercept the sweep arm in tone arm control position, a motor for operating the phonograph, an electric switch for the motor, and means for operating the switch to "on" and "off" positions, the sweep arm having a part engageable with said switch operating means when the tone arm is in its initial and stop position, and the stop member having a part engageable with the switch operating means when the stop member is in its inactive position, the double engagement of said switch operating means being effective for moving the switch to its "off" position.

14. In the record changer phonograph of claim 13, manual means for disengaging the stop member part from the switch operating means to move the switch to the "on" position, manual inward movement of the tone arm causing the sweep arm part to disengage the switch operating means to also move the switch to the "on" position.

15. In a record changer phonograph having a turntable, a tone arm and a magazine for holding a stack of records above the turntable, a sweep arm fixed to the tone arm and oscillatable therewith, a record support and a record engaging member in the magazine, the record support being movable between a position to support a large record and a position to support a small record, the record engaging member being located adjacent to and being movable to and from said record support between a record engaging position when a record or records is in the magazine and a non-engaging position when no record is present in the magazine, a movable control mechanism, means embodied in said control mechanism and means on said sweep arm engageable one with the other to effect interception and stopping of said sweep arm in any one of three positions by said control mechanism, and means operable by the movement of said record support into either of its two positions and by the movement of the engaging member into its non-engaging position for locating said control mechanism in any one of three positions and thereby determining the interception and stopping by the control mechanism of the sweep arm in any one of its three positions, the sweep arm being thereby intercepted in the inward sweep of the tone arm in any one of the following three tone arm positions: initial and stop position when the record engaging member is in the non-engaging position corresponding to no record being present in the magazine, starting position for a large record when the record support is in position to support a large record, and starting position for a small record when the record support is in position supporting a small record.

16. The record changer phonograph of claim 15, in which the said control mechanism comprises a control lever movable into any one of three positions, a rod connecting the record support to the control lever for moving the latter to either one of two positions responsive to the movement of the record support, and a rod connecting the record engaging member to the control lever for moving the latter to its third position responsive to the movement of said record engaging member to the non-engaging position.

17. In the record changer phonograph of claim 15, a motor for operating the phonograph, an electric switch for the motor, and means for operating the switch to "on" and "off" positions, the said sweep arm having a part for actuating the switch operating means when the tone arm is moved to and from its initial and stop position.

18. In a record changer phonograph having a turntable, a tone arm and a magazine for holding a stack of records above the turntable, a sweep arm fixed to the tone arm and oscillatable therewith, a main cam operable for producing a change of record, a stop lever controlled by said cam and movable in relation to said sweep arm, elements on said stop lever and on said sweep arm engageable to effect interception and stopping of said sweep arm in any one of three positions by said stop arm, a record support and a record engaging member in the magazine, the record support being movable between a position to support a large record and a position to support a small record, the record engaging member being movable between a record engaging position when a record or records is in the magazine and a non-engaging position when no record is present in the magazine, a movable control mechanism, elements on said control mechanism and on said stop lever engageable to effect interception and stopping of said stop lever in any one of three positions by said control mechanism; and means operable by the movement of said record support into either of its two positions and by the movement of the engaging member into its non-engaging position for moving said control mechanism into any one of three positions and thereby determining the positioning of the stop lever in any one of its three positions, the stop lever thereby intercepting the sweep arm on the inward sweep of the tone arm in any one of the following three tone arm positions: initial and stop position when the record engaging member is in the non-engaging position corresponding to no record being present in the magazine, starting position for a large record when the record support is in position supporting a large record, and starting position for a small record when the record support is in position supporting a small record.

19. In the record changer phonograph of claim 18, a motor for operating the phonograph, an electric switch for the motor, and means for operating the switch to "on" and "off" positions, the said sweep arm and the said stop lever each having a part for actuating the switch operating means in their movements.

KENNETH R. BENDER.

REFERENCES CITED

The following references are of record in the file of this patent:

UNITED STATES PATENTS

| Number | Name | Date |
|---|---|---|
| 1,889,786 | Mills | Dec. 6, 1932 |
| 1,938,810 | Collison et al. | Dec. 12, 1933 |
| 2,295,092 | Offen | Sept. 8, 1942 |
| 2,328,641 | Glaser | Sept. 7, 1943 |
| 2,333,414 | DeTar | Nov. 2, 1943 |
| 2,352,331 | Leline | June 27, 1944 |
| 2,457,106 | Pressley | Dec. 21, 1948 |

FOREIGN PATENTS

| Number | Country | Date |
|---|---|---|
| 451,846 | Great Britain | Aug. 4, 1936 |